United States Patent [19]
Luo et al.

[11] Patent Number: 5,903,692
[45] Date of Patent: May 11, 1999

[54] METHOD AND SYSTEM FOR PROVIDING A HIGH UNIFORMITY LOW POLARIZATION SENSITIVITY OPTICAL COUPLER

[76] Inventors: Xiaobing Luo; Yu Zheng, both of Sunnyvale, Calif.

[21] Appl. No.: 08/881,242

[22] Filed: Jun. 24, 1997

[51] Int. Cl.⁶ .................................................. G02B 6/26
[52] U.S. Cl. ............................................................ 385/43
[58] Field of Search .................................. 385/39, 41, 42, 385/43, 114, 112, 115, 46, 51, 48, 126, 127, 27, 28

[56] References Cited

U.S. PATENT DOCUMENTS

| | | | |
|---|---|---|---|
| 5,268,979 | 12/1993 | Weidman | 385/42 |
| 5,319,435 | 6/1994 | Melle et al. | 356/32 |
| 5,459,804 | 10/1995 | Stowe | 385/42 |
| 5,642,448 | 6/1997 | Pan et al. | 385/31 |

*Primary Examiner*—Akm E. Ullah

[57] ABSTRACT

A system and method for providing an optical coupler is disclosed. The method and system first places n optical fibers substantially parallel and in close proximity. The number n is odd. The n optical fibers include a center fiber having a first end and a second end. The method and system provide an input signal to the first end of the center fiber and monitor an output signal at the second end of the center fiber. The method and system heat and draw the n optical fibers until the output signal of the center fiber reaches a predetermined value.

25 Claims, 3 Drawing Sheets

METHOD AND SYSTEM FOR PROVIDING A HIGH UNIFORMITY LOW POLARIZATION SENSITIVITY OPTICAL COUPLER

CROSS-REFERENCE TO RELATED APPLICATIONS

The present application is related to co-pending U.S. patent application Ser. No. 08/881,241 entitled "LOW COST, EASY TO BUILD PRECISION WAVELENGTH LOCKER" filed on Jun. 24, 1997 and assigned to the assignee of the present application.

FIELD OF THE INVENTION

The present invention relates to a method and system for an optical coupler and more particularly to a method and system for implementing an 1×n optical coupler having high uniformity and low polarization sensitivity in addition to increased reliability of the coupler.

BACKGROUND OF THE INVENTION

Optical Couplers are typically utilized to separate or combine an optical signal, such as an optic signal in a fiber optic cable. For example, a 1×n optical coupler splits a single input signal into n output signals. Conventional optical couplers are comprised of a plurality of fiber optic cables. Where an optical signal is to be split, the number of cables outputting a signal is more than the number of cables inputting the signal. A 1×n optical coupler, for example, has one input cable and n output cables. Similarly, where an optic signal is to be combined, the number of cables outputting a signal is less than the number of cables inputting the signal. Typically, a 1×n coupler is physically the same as an n×1 coupler. All that differs is into which end of the optical coupler the signal is input.

In order to form a conventional optic coupler, several fiber optic cables are fused together. In order to fuse the fibers, the fibers are placed in contact with each other and twisted. The fibers are twisted so that there is strong optical coupling between fibers. Since alignment of the twisted fibers is not controlled, the fibers' position is checked using only the naked eye. The fibers are typically heated and placed under tension by drawing the fibers. In general, the heat source used to heat the fibers is fueled by hydrogen. As the fibers are heated and drawn, the fibers fuse, forming a joint. To obtain a different number of input fibers than output fibers, a portion of each of a predetermined number of fibers is removed.

For example, a conventional 1×2 optical coupler would be formed by twisting two optical fibers together. The fibers would then be heated and drawn until the fibers fuse at a joint. A portion of a fiber on one side of the joint would then be removed to form the 1×2 coupler.

Two optical coupler properties that are important are uniformity and polarization sensitivity. Uniformity refers to the split in the signal carried by the n fibers in a 1×n or n×1 coupler. High uniformity, having each of the n fibers carry an equal portion of the signal, is desirable.

Low polarization sensitivity is desired to ensure that the optical coupler performs adequately. All conventional optical couplers are, to some degree, dependent on the polarization state of the input signal. For example, the optical coupler may be more likely to transmit light of a particular polarization through one of the n fibers. There is also currently no acceptable method of controlling the polarization state in an optical fiber. To ensure that the deviations due to the polarization of the signal are minimal, the optical coupler should be insensitive to the signal's polarization.

The conventional method for manufacturing twists the fibers to ensure close proximity and, therefore, fusion of the fibers at the joint. Because the fibers are twisted, the position of each fiber is not well controlled. Consequently, the uniformity of the coupler suffers. In addition, twisting the optical fibers also causes the coupler to be more sensitive to the polarization of the optical signal.

Accordingly, what is needed is a system and method for providing a high uniformity, low polarization sensitivity optical coupler. The present invention addresses such a need.

SUMMARY OF THE INVENTION

The present invention provides a method and system for providing an optical coupler. Method and system first place n optical fibers substantially parallel and in close proximity. The number n is odd. The n optical fibers include a center fiber having a first end and a second end. The method and system provide an input signal to the first end of the center fiber and monitor an output signal at the second end of the center fiber. The method and system heat and draw the n optical fibers until the output signal of the center fiber reaches a predetermined value.

According to the system and method disclosed herein, the present invention provides an optical coupler with high uniformity, low polarization sensitivity, and increased reliability, thereby increasing overall system performance.

DETAILED DESCRIPTION OF THE INVENTION

Figure 1A:
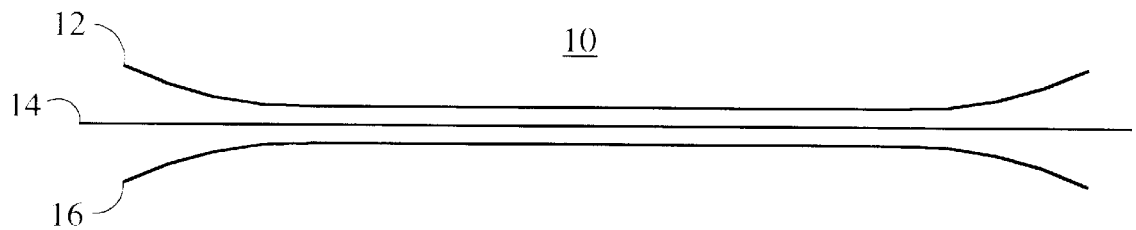
FIG. 1a is a diagram of the placement of fibers for a 1×2 or a 1×3 optical coupler in accordance with the present invention.

The present invention relates to an improvement in optical couplers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Optical couplers are typically utilized to separate or combine an optical signal. Conventional optical couplers are comprised of a plurality of fiber optic cables. Where an optical signal is to be split, the number of cables outputting a signal is greater than the number of cables inputting the signal. A 1×n optical coupler, for example, has one input cable and n output cables. Similarly, where an optic signal is to be combined, the number of cables outputting a signal is less than the number of cables inputting the signal. Typically, a 1×n coupler is physically the same as an n×1 coupler. The coupler divides or combines the signal depending on which end of the optical coupler the signal is used as the input.

To manufacture a conventional optic coupler, several fiber optic cables are fused together. To fuse the fibers, the fibers are placed in contact with each other and twisted. The fibers are twisted to facilitate the fusion of the fibers and have strong optical coupling between fibers. Since alignment of the twisted fibers is not controlled, the fibers' position is checked only using the naked eye. The fibers are typically heated while the fibers are being drawn. Typically hydrogen fuels the heat source. As the fibers are heated and drawn, the fibers fuse, forming a joint. Finally, part of each of all but one of the fibers is removed.

For example, a conventional 1×2 optical coupler is formed by twisting two optical fibers together. The fibers are heated and drawn until the fibers fuse. The portion of a fiber on one side of the joint is removed to form the 1×2 coupler.

Two desirable optical coupler properties are high uniformity and low polarization sensitivity. Uniformity refers to the split in the signal carried by the n fibers in an optical coupler. High uniformity, having each of the n fibers carry an equal portion of the signal, is desirable.

Polarization insensitivity is desired to ensure that the optical coupler operates satisfactorily. An optical coupler may be more likely to transmit light of a particular polarization through one of the n fibers. Such a polarization sensitive optical coupler divides a signal unequally between the n fibers. There is also no means for controlling the polarization of a signal in an optical fiber. Thus, to ensure that the deviations due to the polarization of the signal are reduced, an optical coupler should have low polarization sensitivity.

Although conventional optical couplers formed are operational, those with ordinary skill in the art will realize that such optical couplers have poor polarization sensitivity and low uniformity. Because the conventional method for manufacturing twists the fibers, the exact position of each fiber is not well controlled. Consequently, the uniformity of the coupler suffers. Twisting the optical fibers also causes the coupler to be more sensitive to the polarization of the input signal.

The present invention provides a method and system for a high uniformity, low polarization sensitivity optical coupler. The present invention will be described in terms of a 1×n optical coupler, where n is two through five. However, one of ordinary skill in the art will readily recognize that this method and system will operate effectively for other types of couplers, such as an n×1 couplers.

To more particularly illustrate the method and system in accordance with the present invention, refer now to FIG. 1a depicting a diagram of the positioning of fibers to manufacture a 1×2 or 1×3 optical coupler 10 in accordance with the method and system. In order to provide the optical coupler 10, the fibers 12, 14, and 16 are positioned so that they are substantially parallel and in close proximity. In one embodiment of a system for providing the optical coupler 10, a microscope is used to view the fibers, thereby ensuring alignment.

A signal is input through the center fiber 14. The output signal of center fiber 14 is monitored. Initially, the output signal comprises one hundred percent of the input signal. The fibers 12, 14, and 16 are then heated using a mixture of hydrogen and oxygen and drawn. The mixture of gases ensure a higher temperature for using the fibers 12, 14, and 16 together.

As the fibers are heated and drawn, the output signal of the center fiber 14 is monitored. As the fibers 12, 14, and 16 fuse at a joint, the output signal from the center fiber 14 decreases and the output signal from the outside fibers 12 and 16 increases. If a 1×3 coupler is to be manufactured, the fibers 12, 14, and 16 are heated and drawn until the output signal from the center fiber 14 is one-third of the input. At this time, the output signal for each of the outer fibers 12 and 16 is also one-third of the input signal. This symmetry is ensured by originally placing the three fibers 12, 14, and 16 substantially parallel.

Figure 1B:
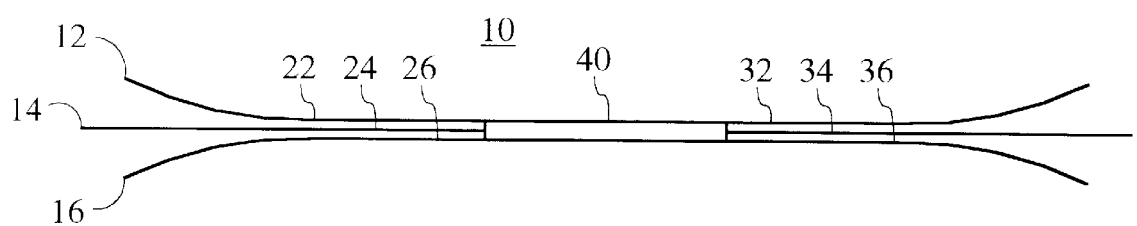
FIG. 1b is a diagram of the fibers for a 1×2 or a 1×3 optical coupler after heating and drawing in accordance with the present invention.
Figure 1C:
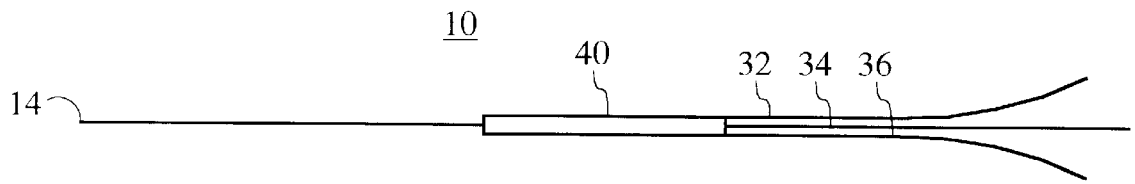
FIG. 1c is a diagram of the fibers for a 1×2 optical coupler after heating, drawing, and removal of fibers in accordance with the present invention.

FIG. 1b depicts the optical coupler 10 after the fibers have been heated and drawn. In order to form a 1×2 or a 1×3 optical coupler, the portions 22 and 26 of fibers 12 and 16 on one side of the fused area 40 are removed. Only the portion 24 of the center fiber 14 remains on the side of the coupler to which the signal is input. If the coupler 10 is to be a 1×3 optical coupler, no other fibers are removed. FIG. 1c depicts the coupler 10 after heating, drawing, and removal of the fibers to form a 1×3 optical coupler.

Referring back to FIG. 1b, if a 1×2 coupler is to be formed, heating and drawing the three fibers 12, 14, and 16 is continued until the output signal from the center fiber 14 is zero. The output signal from the center fiber 14 is zero because as the fibers fuse, the center fiber 14 collapses.

Figure 1D:
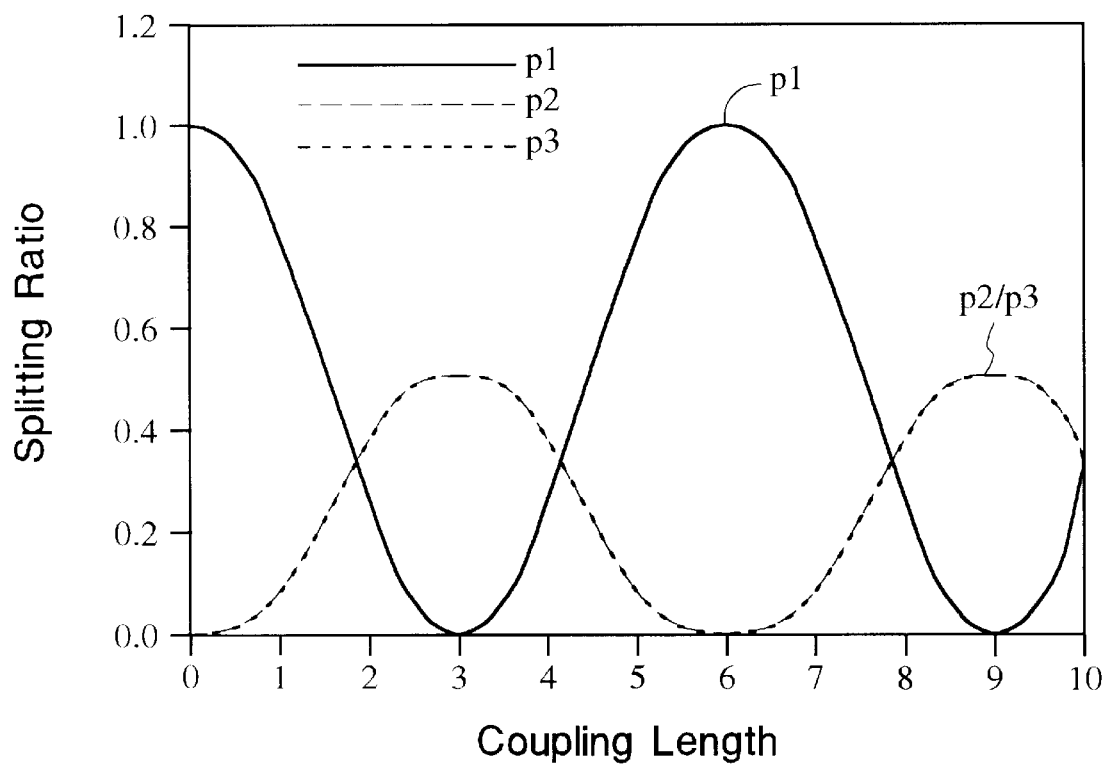
FIG. 1d illustrates the splitting ratio curves for the output fibers.
Figure 1E:
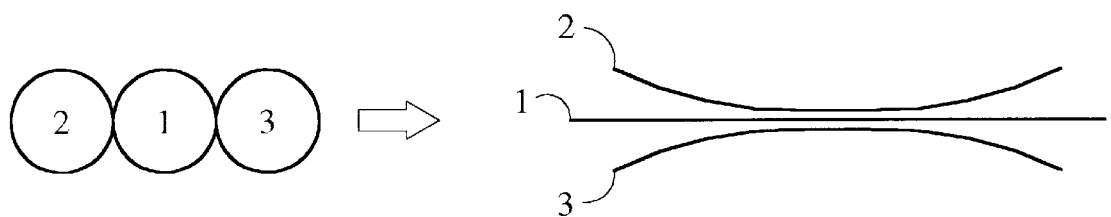
FIG. 1e is an illustration of an end view of three fibers.

The theory behind this feature is as follows. The cross-section of the parallel fiber arrangement for a 1×2 linear array coupler is shown in the inset of FIG. 1d. Making the assumption that coupling occurs between adjacent fibers only, then for unit power launched into the center fiber 14, the output power $P_n$ in each output port is:

| | |
|---|---|
| $P_1 = \cos^2[\sqrt{(2)}CL]$ | (1a) |
| $P_2 = 1.2 \sin^2[\sqrt{(2)}CL]$ | (1b) |
| $P_3 = P^2$ | (1c) | where C is the coupling coefficient between adjacent fibers and L is the coupling length. (Refer to FIG. 1e.) Note that the powers in the two side fibers are always equal and the maximum coupled power in each side fiber is 50% of the total power.

When the output signal from the center fiber 14 goes to zero, all of the input signal is transferred from the center fiber 14 to fibers 12 and 16. When the output signal from the center fiber 14 is zero, the output signal for each of the outer fibers 12 and 16 is also one-half of the input signal. This symmetry is ensured by placing the three fibers 12, 14, and 16 substantially parallel.

Figure 1F:
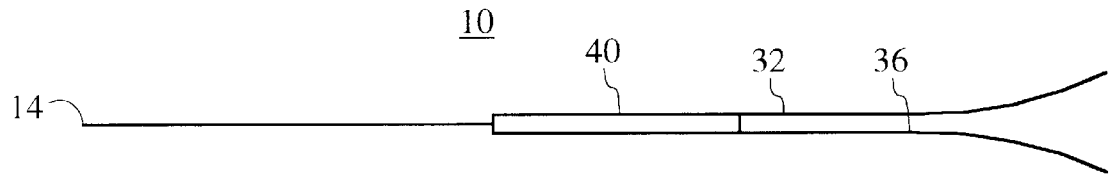
FIG. 1f is a diagram of the fibers for a 1×3 optical coupler after heating, drawing, and removal of fibers in accordance with the present invention.

The portions 22 and 26 of fibers 12 and 16 on one side of the fused area 40 are removed. Only the portion 24 of the center fiber 14 remains on the side of the coupler to which the signal is input. For a 1×2 coupler, the portion 34 of the center fiber 14 on the opposing side of the fused area 40 is removed. Consequently, the portion 24 of the center fiber 14 comprises the input, and the portions 32 and 34 of the fibers 12 and 16, respectively, comprise the output. FIG. 1f depicts the coupler 10 after heating, drawing, and removal of the fibers to form a 1×2 optical coupler.

Because the optical fibers 12, 14, and 16 were placed substantially parallel, the uniformity of the optical coupler 10 is very high. In addition, optical couplers made in accordance with the method and system have low polarization sensitivity. The method and system can be extended to other optical couplers by using more fibers.

Figure 2A:
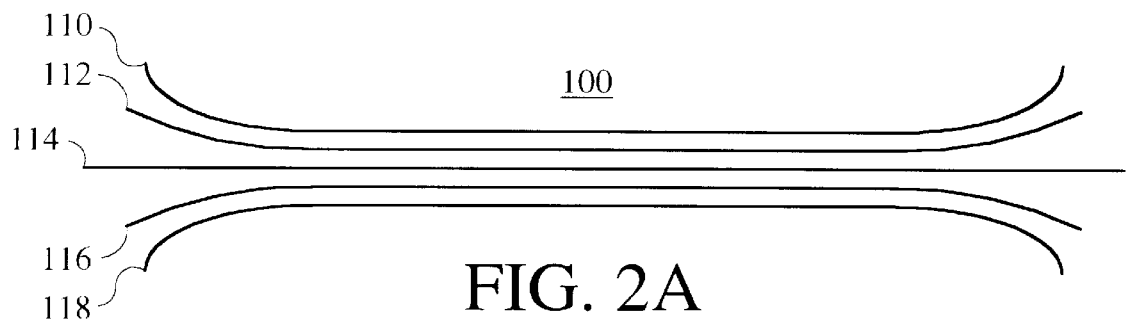
FIG. 2a is a diagram of the placement of the fibers for a 1×4 or a 1×5 optical coupler in accordance with the present invention.

For example, FIG. 2a depicts the placement of the fibers in accordance with the method and system for a 1×4 or a 1×5 optical coupler 100. The optical fibers 110, 112, 114, 116, and 118 are placed substantially in parallel. In one embodiment, a microscope is utilized to ensure that the optical fibers are substantially in parallel. A signal is input through the center fiber 114. The output signal of the center fiber 114 is monitored. The fibers 110, 112, 114, 116, and 118 are then heated and drawn in a mixture of oxygen and hydrogen.

Figure 2B:
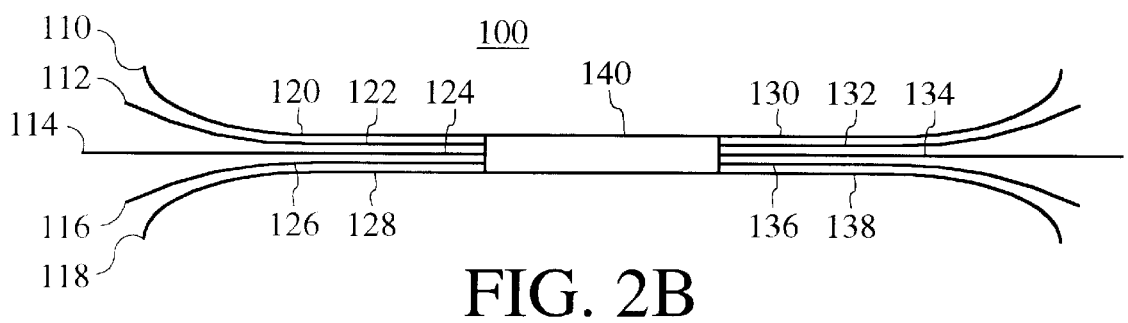
FIG. 2b is a diagram of the fibers for a 1×4 or a 1×5 optical coupler after heating and drawing in accordance with the present invention.
Figure 2C:
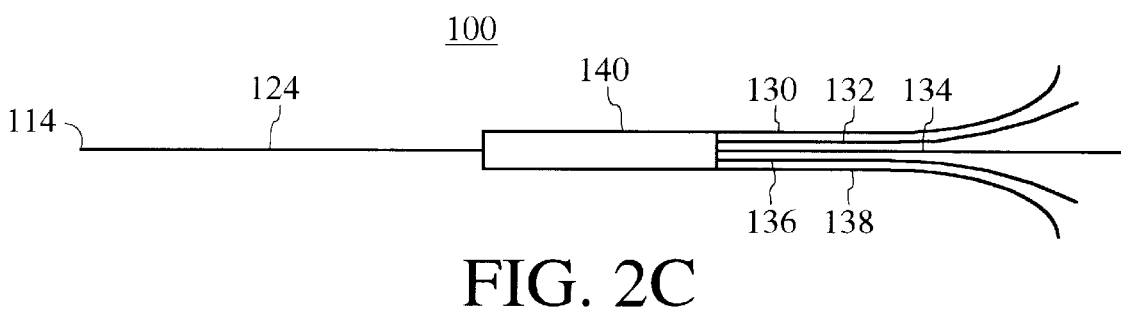
FIG. 2c is a diagram of the fibers for a 1×4 optical coupler after heating, drawing, and removal of fibers in accordance with the present invention.

FIG. 2b depicts the fibers 110, 112, 114, 116, and 118 after a fused area 140 has formed. If a 1×5 optical coupler is to be formed, the fibers 110, 112, 114, 116, and 118 are heated and drawn until the output signal from the center fiber 114 is one-fifth of the input signal. Therefore, the output signal from each of the fibers is one-fifth of the input signal. The portions 120, 122, 126 and 128 of fibers 110, 112, 116, and 118 on one side of the fused area 140 are then removed. Thus, a single input and five outputs are provided. FIG. 2c depicts the coupler 100 after heating, drawing, and removal of the fibers to form a 1×5 optical coupler. Because the fibers 110, 112, 114, 116, and 118 were placed substantially parallel prior to heating and drawing, high uniformity and low polarization sensitivity are achieved in either a 1×4 or a 1×5 coupler.

Figure 2D:
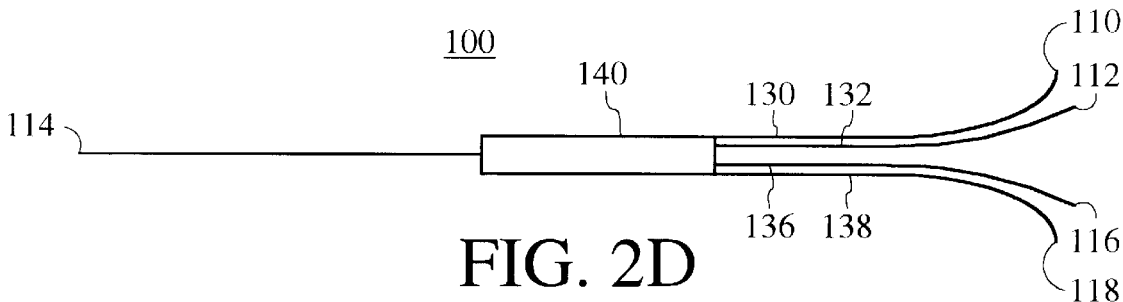
FIG. 2d is a diagram of the fibers for a 1×5 optical coupler after heating, drawing, and removal of fibers in accordance with the present invention.

Referring back to FIG. 2b, if a 1×4 optical coupler is to be formed, the fibers 110, 112, 114, 116, and 118 are heated and drawn until the output signal from the center fiber 114 is zero. The output signal from each of the fibers 110, 112, 116, and 118 is one-fourth of the input signal. The portions 120, 122, 126 and 128 of fibers 110, 112, 116, and 118 on one side of the fused area 140 are then removed. Thus, a single input is provided. The portion 134 of the center fiber 114 on the other side of the fused are 140 is then removed to provide four outputs. FIG. 2d depicts the coupler 100 after heating, drawing, and removal of the fibers to form a 1×4 optical coupler.

Because the method and system utilize a mixture of hydrogen and oxygen to fuel the heating, higher temperatures are achieved. As a result, the method and system are better able to form fused area 40 of optical coupler 10 and the fused area 140 of optical coupler 100. Consequently, reliability of the optical coupler 10 and the optical coupler 100 is improved.

A method and system has been disclosed for providing an optical coupler having high uniformity and low polarization sensitivity. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for providing an optical coupler using n optical fibers, where n is an odd number, the method comprising the steps of:

placing the n optical fibers substantially parallel and in close proximity, the n optical fibers further including a center fiber, the center fiber having a first end and a second end;

providing an input signal to the first end of the center fiber;

monitoring an output signal at the second end of the center fiber; and heating and drawing the n optical fibers until the output signal of the center fiber reaches a predetermined value;

wherein substantially all of a portion of each of the n optical fibers are fused to form a fused area, the fused area being formed substantially only of the portion of each of the n optical fibers.

2. The method of claim 1 wherein the predetermined value is 1/n of the input signal.

3. The method of claim 2 further including the step of:

removing a predetermined portion of each of the n fibers except the center fiber.

4. The method of claim 3 wherein the step of heating and drawing the n optical fibers further comprises:

heating the n optical fibers using a combination of oxygen and hydrogen gas and drawing the n optical fibers until the output signal at the second end of the center fiber reaches the predetermined value.

5. The method of claim 4 wherein n is three.

6. The method of claim 4 wherein n is five.

7. The method of claim 1 wherein the predetermined value is zero.

8. The method of claim 7 further comprising the step of:

removing a predetermined portion of the center fiber, the predetermined portion of the center fiber further including the second end.

9. The method of claim 8 further including the step of:

removing a second predetermined portion of each of the n fibers except the center fiber.

10. The method of claim 9 wherein the step of heating and drawing the n optical fibers further comprises:

heating the n optical fibers using a combination of oxygen and hydrogen gas and drawing the n optical fibers until the output signal of the center fiber reaches the predetermined value.

11. The method of claim 10 wherein n is two.

12. The method of claim 10 wherein n is four.

13. A system for providing an optical coupler, the optical coupler including n optical fibers, where n is odd, the system comprising:

means coupled to the n optical fibers for placing the n optical fibers substantially parallel and in close proximity, the n optical fibers further comprising a center fiber, the center fiber having a first end and a second end;

means coupled to the first end of the center fiber for providing an input signal to a center fiber;

means coupled to the second end of the center fiber for monitoring an output signal of the center fiber; and means for heating and drawing the n optical fibers until the output signal of the center fiber reaches a predetermined value;

wherein substantially all of a portion of each of the n optical fibers are fused to form a fused area, the fused area being formed substantially only of the portion of each of the n optical fibers.

14. The system of claim 13 wherein the predetermined value is 1/n of the input signal.

15. The system of claim 14 further comprising:

means for removing a predetermined portion of each of the n optical fibers except the center fiber.

16. The system of claim 15 wherein the means for heating and drawing the n optical fibers further comprises:

means for heating the n optical fibers using a combination of oxygen and hydrogen gas and drawing the n optical fibers until the output signal of the center fiber reaches the predetermined value.

17. The system of claim 16 wherein n is three.

18. The system of claim 16 wherein n is five.

19. The system of claim 13 wherein the predetermined value is zero.

20. The system of claim 19 further comprising:

means for removing a predetermined portion of the center fiber, the predetermined portion of the center fiber further including the second end.

21. The system of claim 20 further comprising:

means for removing a second predetermined portion of each of the n optical fibers except the center fiber.

22. The system of claim 21 wherein the means for heating and drawing the n optical fibers further comprises:

means for heating the n optical fibers using a combination of oxygen and hydrogen gas and drawing the n optical fibers until the output signal of the center fiber reaches the predetermined value.

23. The system of claim 22 wherein n is two.

24. The system of claim 22 wherein n is four.

25. An optical coupler comprising:

a plurality of optical fibers, a portion of each of the plurality of optical fibers being fused to form a fused area, the portion of each of the plurality of optical fibers being substantially parallel, the fused area being formed substantially only of the portion of each of the plurality of optical fibers; and wherein the fused area is formed by placing each portion of each of the plurality of optical fibers substantially parallel and in close proximity, providing an input signal to the first end of the center fiber, monitoring an output signal at the second end of the center fiber; and heating and drawing the n optical fibers until the output signal of the center fiber reaches a predetermined value.

* * * * *

UNITED STATES PATENT AND TRADEMARK OFFICE
CERTIFICATE OF CORRECTION

| | |
|---|---|
| PATENT NO. | : 5,903,692 |
| DATED | : May 11, 1999 |
| INVENTOR(S) | : Luo et al. |

It is certified that error appears in the above-identified patent and that said Letters Patent is hereby corrected as shown below:

<u>Title page,</u>
Please insert item [73] Assignee: Oplink Communications, Inc. San Jose, California.

Please insert Attorney, Agent or Firm: Sawyer & Associates

Signed and Sealed this

Twenty-fifth Day of September, 2001

*Attest:*

*Attesting Officer*

NICHOLAS P. GODICI
*Acting Director of the United States Patent and Trademark Office*